United States Patent [19]

Erhardt

[11] Patent Number: 5,010,442
[45] Date of Patent: Apr. 23, 1991

[54] BREAK-AWAY ELEMENT FOR ELECTRICAL CAPACITOR

[75] Inventor: Werner Erhardt, Ballendorf, Fed. Rep. of Germany

[73] Assignee: Siemens Aktiengesellschaft, Berlin and Munich, Fed. Rep. of Germany

[21] Appl. No.: 357,251

[22] Filed: May 26, 1989

[30] Foreign Application Priority Data

May 26, 1988 [DE] Fed. Rep. of Germany ... 3817903

[51] Int. Cl.⁵ .............................................. H01G 1/13
[52] U.S. Cl. ................................................... 361/275
[58] Field of Search ...................... 361/272, 275, 534; 73/802, 799

[56] References Cited

U.S. PATENT DOCUMENTS

| 2,896,049 | 7/1959 | Maier | 200/113 |
| 4,150,419 | 4/1979 | Epple et al. | 361/275 |
| 4,308,569 | 12/1981 | Rheindorf | 361/275 |

FOREIGN PATENT DOCUMENTS

| 0076693 | 4/1983 | European Pat. Off. | |
| 372119 | 5/1922 | Fed. Rep. of Germany | |
| 975024 | 7/1961 | Fed. Rep. of Germany | |
| 2220022 | 11/1973 | Fed. Rep. of Germany | |
| 2450213 | 4/1976 | Fed. Rep. of Germany | 361/275 |
| 3047876 | 7/1982 | Fed. Rep. of Germany | |
| 3320703 | 12/1984 | Fed. Rep. of Germany | |
| 2106715 | 4/1983 | United Kingdom | |

OTHER PUBLICATIONS

I.B.M. Technical Disclosure Bulletin Jan. 1983 vol. 25, No. 8, pg. 4081 361-275.

Primary Examiner—Donald A. Griffin
Attorney, Agent, or Firm—Hill, Van Santer, Steadman & Simpson

[57] ABSTRACT

A break-away element for an electrical capacitor is used in conjunction with a capacitor winding integrated into a housing having a cover and a floor. Electrical terminals are connected to the power leads of the capacitor winding through insulating bushings. One or more rated break locations are provided in the power leads, the rated break locations having a geometrical shape with a continuous transition from the cross section of the power lead in the form of a wire to the cross section of the rated break locations.

11 Claims, 1 Drawing Sheet

BREAK-AWAY ELEMENT FOR ELECTRICAL CAPACITOR

BACKGROUND OF THE INVENTION

1. Field of the Invention

The present invention is directed generally to an overpressure break-away fuse in an electrical capacitor, and more particularly to an overpressure break-away fuse composed of a break-away element having a rated break location arranged essentially symmetrically relative to a longitudinal axis of the break-away element. The invention is particularly adapted for use in power capacitors.

2. Description of the Related Art

A capacitor is disclosed in German Patent 975,024 and the corresponding U.S. Pat. No. 2,896,049. The capacitor includes a break-away element composed of a break-away strip of metal inserted between two tension members. The break-away strip has a rated break location arranged essentially symmetrically relative to its longitudinal axis. The rated break location is composed of two punched notches lying opposite one another in the strip.

German Published Application 30 47 876 A1 discloses a break-away wire for an overpressure break-away fuse that is provided with a rated break location having a diminished cross section that is punched in, whereby the punched part of the wire is preserved during the process so that the punched portion of the wire remains on the wire offset after it is punched.

Further, German Patent No. 22 20 022 C3 discloses a break-away wire having a rated break location of reduced cross section, whereby the wire material is mechanically eroded at one side eccentrically relative to the wire axis.

Due to the manufacturing processes used, the geometries of the known rated break locations for electrical capacitors exhibit sharp edges and/or points that lead to a disturbance of the electrical and magnetic fields therein. As a result, disturbing effects appear which have an undesirable effect on the current flow, which in turn leads to localized heating and a greater tendency toward sparking.

SUMMARY OF THE INVENTION

An object of the present invention is to provide a capacitor with an overpressure break-away fuse having a geometry of a nature such that disturbances of the electrical and/or magnetic fields and, thus, undesired localized heating and tendencies toward sparking are prevented to the greatest possible degree.

This and other objects are achieved in accordance with the principles of the invention wherein a break-away element is composed of a wire and in that a rated break location is provided having a geometrical shape with a continuous transition from the wire cross section to the cross section of the rated break location. The break-away element is used in capacitors, especially power capacitors, in the known way to interrupt power flow to the capacitor winding upon the build-up of excessive pressure in the capacitor casing.

The advantages achieved with the break-away element of the present invention include having the electrical and/or magnetic field lines in the electrical conductor proceeding continuously through the transition from the conductor or wire cross section to the narrow break location so that the disturbances recited above are avoided to the greatest possible extent.

Expedient developments of the invention include providing a rated break location produced without erosion of material, or alternately a rated break location produced by erosion of material from the wire of the break-away element.

A method for manufacturing a break-away element for an electrical capacitor includes introducing a wire between turning rollers whose spacing corresponds to the desired remaining cross section of the rated break location. Preferably, at least two such sets of rollers are provided. In a further improvement, at least three rollers are provided arranged in a circle and the wire is introduced into the center of the reference circle of the rollers. An alternate embodiment of the method is to conduct the break-away wire through grinding wheels which close in thereon and form the rated break location.

In each embodiment, a gradual change in the cross section of the wire is formed from its original size to the break location, and back again.

DESCRIPTION OF THE PREFERRED EMBODIMENTS

Figure 1:
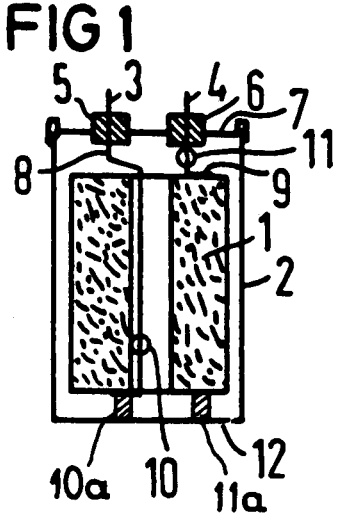
FIG. 1 is a cross section generally along an axis of a capacitor shown integrated into a housing and having overpressure break-away fuses.

Referring first to FIG. 1, a capacitor winding 1, such as of a power capacitor, is integrated into a housing 2. The capacitor winding 1 has external electrical terminals 3 and 4 which are conducted through insulated bushings 5 and 6 mounted in a cover 7 and thereby extend into the interior of the housing 2. Connected between the terminals 3 and 4 and the winding 1 are power leads 8 and 9 for transmitting electrical energy to the capacitor winding 1, the power leads 8 and 9 being arranged in the interior of the housing 2. At a position along the length of each lead 8 and 9 is formed electrical break-away fuses with rated break locations 10 and 11. It is also possible to provide a rated break location 10 or 11 in only one of the power leads 8 and 9 since a disconnection of the capacitor winding 1 from a corresponding electrical terminal 3 or 4 quite adequately results in an interruption of power to the winding being achieved.

The response of the overpressure break-away fuse 10 or 11 is achieved by known measures which are not shown in detail in FIG. 1 but which include, for example, a floor 12 of the housing 2 being fashioned as a flexible working membrane to which the break-away fuse 10 or 11 is secured with pre-stressing elements 10a or 11a. This may include an arrangement as shown, for example, in U.S. Pat. No. 2,896,049, incorporated herein by reference. The floor 12 flexes downward as the pressure within the capacitor housing 2 builds, until the rated break force on the fuse 10 or 11 is reached, at which time the fuse breaks and interrupts current flow.

It is also possible to apply what are referred to as expansion beads in the wall of the housing 2 or to shape the cover 7 in a corresponding fashion. All of these measures achieve a change in the shape of the housing which occurs as an overpressure situation arises in the capacitor. The change in housing shape actuates the overpressure break-away fuse by breaking or tearing it at the provided rated break location.

Figure 2:
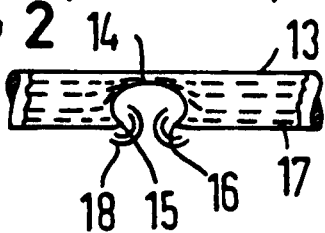
FIG. 2 is a side view of an overpressure break-away fuse of the prior art.

In FIG. 2 is shown a break-away wire 13 of the prior art that includes a rated break location 14. The rated break location 14 is produced by mechanical erosion of material from the wire 13 which results in the formation of points 15 and 16 adjacent the break location, as well as to the possibility of mechanical burrs (not shown) being present on the wire. On one hand, high field strengths for the electromagnetic field 18 occur in the region of the points 15 and 16, which leads to a greater tendency toward spraying or sparking at the points 15 and 16. On the other hand, the electrical field lines (as represented by dashed lines 17) in the region of the rated break location 14 are constricted abruptly due to the resulting shape of the wire such that current conduction along the wire 13 is unfavorable influenced, thereby causing topical or localized heating to occur at around the rated break location 14.

Figure 3:
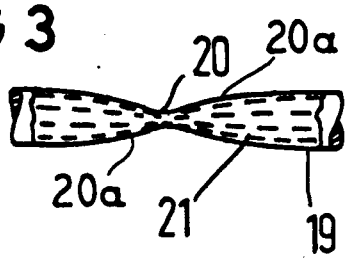
FIG. 3 is a side view of an overpressure break-away fuse according to the principles of the present invention.

Referring to FIG. 3, a break-away wire 19 according to the invention is shown including a rated break location 20. The rated break location 20 is distinguished from the known break-away fuse in that its geometrical shape is formed by a gradual, continuous transition from the relatively larger cross section of the break away wire 19 to the smaller cross section of the rated break location 20. This transition in cross section occurs in transition regions 20a. What is achieved by the shape of the improved break-away element as shown in FIG. 3 is that, first, the points and edges present in the prior art break-away element are absent in the device of the invention and, second, the electrical field lines (illustrated by dashed lines 21) have a generally continuous course at the transition from the large cross section of the break away wire 19 to the reduced cross section of the rated break location 20. In other words, the electrical field lines change gently rather than abruptly. Undesired spray or spark phenomena and topical or localized heating are thus avoided.

Figure 4:
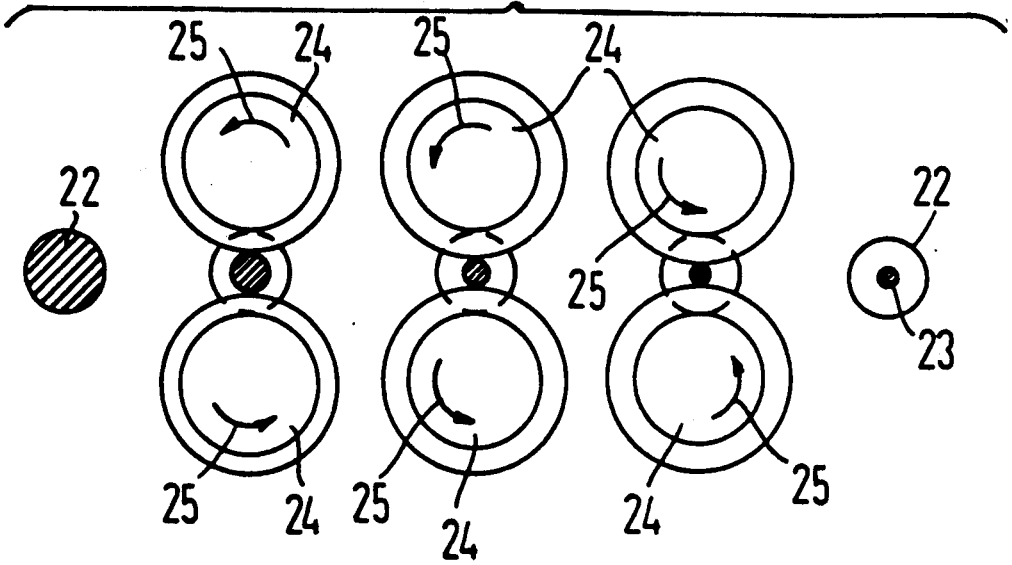
FIG. 4 schematically illustrates the steps of a manufacturing method of the invention.

In FIG. 4 is shown a method for manufacturing a rated break location 23 in a break-away wire 22. To this end, the break-away wire 22 is conducted between sets of rollers 24 that turn in the direction of the arrows 25. In the illustration, three sets of rollers 24 are used, each set being more closely spaced than the previous set. The original diameter of the wire 22, as shown on the left side of FIG. 4, is reduced during the manufacturing process until it reaches the desired remaining cross section at the rated break location 23, as shown to the right hand side of FIG. 4. Thus, the wire is malleably deformed to achieve the break location.

Figure 5:
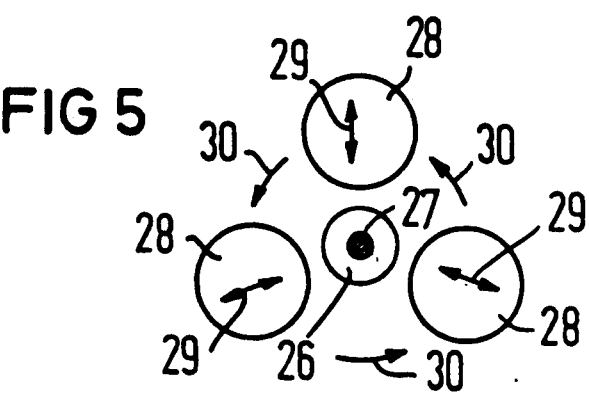
FIG. 5 schematically illustrates a further manufacturing method for an overpressure break-away fuse of the invention.

FIG. 5 shows a further possibility of providing a break-away wire 26 with a rated break location 27. To this end, the wire 26 is brought into the center of a reference circle of rollers 28 which, first, move in the direction of the arrows 30 and, second, move inwardly in the direction of the arrows 29 until the desired cross section of the rated break location 27 is achieved. Thus, the wire is deformed to achieve a gradual reduction in the cross section or diameter, the reduced cross section region being generally symmetrical relative to the longitudinal axis of the wire.

The methods shown in FIGS. 4 and 5 for producing a rated break location exhibit a number of advantages. First, no tool wear occurs and, second, a continuous production flow of overpressure break-away fuses is possible. Due to the farthest-reaching symmetrical arrangement of the rated break location, a reduced sensitivity to mechanical damage arises. What is critical is that no burrs arise in the manufacturing methods and that no damage to the wire surface occur, such as to tin-plated wires.

Instead of the sequence of rollers as shown in FIG. 4, the methods of the invention can be realized using grinding wheels in place of the rollers to reduce the diameter of the wire at the break location. The same conductor geometry is thereby achieved, although not all break-away wires can be provided with a rated break location using erosion of the material. For instance, only those break-away wires which do not have a treated surface, such as a tin-plating or copper coating, can be provided with rated break locations using grinding wheels without effecting the coating.

It should be understood from the foregoing that the shape of the rollers and/or the grinding wheels is such that the desired continuous transition is achieved in the region of the rated break location.

The subject matter of the invention, thus, accomplishes the cross sectional constriction needed for disconnection at the break location and also realizes an optimum shape for the current conduction and for the resulting the electromagnetic field.

The break-away element of the invention is particularly useful in power capacitors to interrupt electrical current flow to the winding when excess pressure builds within the capacitor housing. As the capacitor housing walls flex due to the build up of the excess pressure, the break away elements are snapped so that electrical current no longer flows to the winding. The break locations are of predetermined cross sections which are rated to break at predetermined pressures.

Although other modifications and changes may be suggested by those skilled in the art, it is the intention of the inventor to embody within the patent warranted hereon all changes and modifications as reasonably and properly come within the scope of his contribution to the art.

I claim:

1. In an electrical capacitor having a housing, an improved over-pressure break-away element composed of a malleably deformed wire having a rated break location with a smooth surface and a gradual continuous transition from a cross section of said wire to a cross section of said break location.

2. In an electrical capacitor as claimed in claim 1, wherein said rated break location is produced without erosion of material from said wire.

3. In an electrical capacitor having a housing, an improved over-pressure break-away fuse, comprising: a break-away element composed of a wire having a rated break location of with a smooth surface and a gradual continuous transition from a cross section of said wire to a cross section of said break location, said rated break location being produced by erosion of material from said wire.

4. A method for manufacturing a break-away element of an electrical capacitor, comprising the steps of:
introducing a malleably deformable break-away wire of a first cross section between turning rollers whose spacing corresponds to a desired remaining cross section of a rated break location, and compressing said break-away wire between said turning rollers to achieve a portion of said wire with a gradual continuous transition of cross section to a second cross section corresponding to said cross section of said rated break location, said portion of said wire having a uniformly reduced smooth surface.

5. A method as claimed in claim 4 wherein said turning rollers are at least two rollers.

6. A method as claimed in claim 4, wherein said turning rollers are at least three rollers defining a reference circle and said break-away wire is introduced into a center of said reference circle for cross section reduction.

7. A method of manufacturing a break-away element for an electrical capacitor, comprising the steps of:
  conduct a break-away wire of a first cross section through closing grinding wheels to form a break-away region of a reduced second cross section and transition regions on either side of said break-away region with smooth surfaces and a gradual continuous change in cross section between said first and second cross section.

8. A break-away element for an electrical capacitor, comprising:
  a malleably deformed wire of a first cross section;
  a break location at a location along said wire, said break location being of a second cross section that is smaller than said first cross section;
  at least one transition region between said wire of said first cross section and said break location of said second cross section, said at least one transition region being of continuously gradually changing cross section and having a uniformly reduced smooth surface.

9. A break-away element as claimed in claim 8, wherein said break location and said at least one transition region are formed by deforming said wire at said break location and said at least one transition region.

10. A break-away element for an electrical capacitor, comprising:
  a malleably deformable wire of a first cross section;
  a break location at a location along said wire, said break location being of a second cross section that is smaller than said first cross section;
  at least one transition region between said wire of said first cross section and said break location of said second cross section, said at least one transition region being of continuously gradually changing cross section and having a uniformly reduced smooth surface;
  said break location said at least one transition region being formed by eroding said wire at said break location and said at least one transition region.

11. A break-away element as claimed in claim 8, wherein said at least one transition region is a transition region on either side of said break location.

* * * * *